United States Patent [19]

Suzuki

[11] 4,122,384
[45] Oct. 24, 1978

[54] THREE-PHASE AC VOLTAGE CONTROL CIRCUIT

[75] Inventor: Shigehiko Suzuki, Inazawa, Japan

[73] Assignee: Mitsubishi Denki Kabushiki Kaisha, Tokyo, Japan

[21] Appl. No.: 790,819

[22] Filed: Apr. 25, 1977

[30] Foreign Application Priority Data

Apr. 27, 1976 [JP] Japan .................. 51/48066

[51] Int. Cl.² .......................................... G05F 1/56
[52] U.S. Cl. ................................ 323/24; 307/239; 323/25; 323/34
[58] Field of Search .............. 323/25, 22 SC, 24, 25, 323/34; 307/239, 241, 246, 247 R

[56] References Cited

U.S. PATENT DOCUMENTS

| 3,432,725 | 3/1969 | Rotch | 323/24 |
| 3,652,924 | 3/1972 | Dieterich et al. | 323/24 |
| 3,746,969 | 7/1973 | Gessaroli et al. | 323/24 |
| 3,958,172 | 5/1976 | Beck | 323/24 |

Primary Examiner—Gerald Goldberg
Attorney, Agent, or Firm—Oblon, Fisher, Spivak, McClelland & Maier

[57] ABSTRACT

In a three-phase AC voltage control circuit containing reverse parallel connections of a thyristor and a diode or reverse parallel connections of thyristors in at least two phases, each asymmetrical AC voltage obtained by applying a line voltage of the power source having 30 degrees of phase lead from that of the phase voltage of the power source in the phase containing the thyristor to each polarized delay circuit is used as the power source for a firing angle control circuit of the thyristor in the phase.

4 Claims, 5 Drawing Figures

4,122,384

THREE-PHASE AC VOLTAGE CONTROL CIRCUIT

BACKGROUND OF THE INVENTION

The present invention relates improved firing angle control circuits of the thyristors in a voltage control circuit containing reverse parallel connections of a thyristor and a diode or reverse parallel connections of thyristors in at least two phases of the three-phase AC circuit.

The prior art three-phase AC voltage control circuit will be illustrated.

FIG. 1 is a prior art circuit diagram and

FIG. 2 shows voltage waveforms in various parts in the circuit.

In FIG. 1, the references R, S and T respectively designate line terminals of a three-phase AC power source; L designates a load; $S_1$ to $S_3$ and $D_1$ to $D_3$ respectively designate thyristors and diodes for controlling the output voltage; $S_1$ and $D_1$ are connected in reverse parallel connection; $S_2$ and $D_2$ are connected in reverse parallel connection and $S_3$ and $D_3$ are connected in reverse parallel connection, and they are respectively connected in the R, S and T phases between the line terminals of the three-phase AC power source and the load to form the main circuit.

The references $G_R$, $G_S$, $G_T$ respectively designate firing angle control circuits for the thyristors $S_1$, $S_2$, $S_3$ in the R phase, the S phase and the T phase. The internal circuits of $G_S$ and $G_T$ are the same as the internal circuit of $G_R$. The references $T_1$ to $T_3$ respectively designate power source transformers for the firing angle control circuits and the terminals of the primary windings of the transformers are respectively connected to the power source terminals R, S, T and the terminals of the secondary windings of the transformers are respectively connected to the firming angle control circuits $G_R$, $G_S$, $G_T$.

A voltage having 30° of phase lag from that of the phase voltage of the power source corresponding to the firing angle control circuit, is applied to each power source transformer. That is, a voltage having the same phase as the phase of the voltage between R-T is applied to the firing angle control circuit $G_R$ in the R phase; a voltage having the same phase as the phase of the voltage between S-R is applied to the firing angle control circuit $G_S$ in the S phase and a voltage having the same phase as the phase of voltage between T-S is applied to the firing angle control circuit $G_T$ in the T phase.

The firing angle control circuit $G_R$ in the R phase comprises a diode for rectification $D_4$, a resistor $R_1$, a zener diode $D_5$, a phase control variable timing resistor $R_2$, a timing capacitor $C_1$, a resistor $R_3$, a unijunction transistor $TR_1$, a pulse transformer $PT_1$ and a resistor $R_4$.

FIG. 2(1) shows the line voltages $V_{RS}$, $V_{ST}$, $V_{TR}$ and the phase voltage $V_R$ in the R phase of the power source.

The AC voltage $V_{1R}$ having 30° of phase lag from the phase voltage $V_R$ in the R phase in FIG. 2(2) is applied from the terminal of the secondary winding of the transformer $T_1$ to the firing angle control circuit $G_R$ in the R phase.

The AC voltage $V_{1R}$ is converted to the half-wave rectified wave $V_{2R}$ through the diode $D_4$ as shown in FIG. 2(3) and it is further converted to the trapezoidal wave $V_{3R}$ by being clipped by the zener diode $D_5$ and it is applied to the timing circuit having the resistor $R_2$ and the capacitor $C_1$ and the unijunction transistor $TR_1$.

The timing capacitor $C_1$ is charged through the timing resistor $R_2$ and the charged voltage $V_{4R}$ is shown in FIG. 2(4). At the time when the voltage having the trapezoidal waveform $V_{3R}$ begins to rise (at the point of $\theta = 30°$ of phase in FIG. 2), the charging to $C_1$ is initiated. When the charged voltage $V_{4R}$ in $C_1$ reached to the breakover voltage of the unijunction transistor $TR_1$ $\eta \cdot V_{3R}$ ($\eta$: stand-off ratio of $TR_1$), the charge in $C_1$ is discharged through the unijunction transistor $TR_1$ and the primary winding of the pulse transformer $PT_1$ to generate the pulse output $V_{5R}$ to the secondary winding of the pulse transformer $PT_1$ as shown in FIG. 2(5).

The pulse output $V_{5R}$ of the pulse transformer $PT_1$ is applied through the resistor $R_4$ between G-K of the thyristor $S_1$ in the R phase whereby the thyristor $S_1$ in the R phase is fired by the pulse output $V_{5R}$ and the voltage $V_{6R}$ between A-K of the thyristor $S_1$ becomes substantially zero as shown in FIG. 2(6).

The firing angle $\alpha$ of the thyristor $S_1$ can be controlled according to be FIG. 2(a) to (d) by controlling the charging speed of the timing capacitor $C_1$ by adjusting the variable resistor $R_2$.

The operations of the firing angle control circuits $G_S$, $G_T$ in the S phase and T phase are the same as the operations of the firing angle control circuit $G_R$ in the R phase.

The voltage $V_{6R}$ between A-K of the thyristor $S_1$ in the R phase and the output voltage $V_{ORS}$ between R-S to each firing angle are as shown in FIG. 2(6), (7) in the case of equal firing angles of the thyristors $S_1$ to $S_3$ in the R, S and T phases.

In FIG. 2, the charging of the timing capacitor of the firing angle control circuit is initiated from the point of the phase $\theta = 30°$ and the time for charging the timing capacitor to the breakover voltage of the unijunction transistor is at least about 30° and accordingly, the maximum firing angle $\alpha$ is about 150° in the circuit of FIG. 1.

However, in the voltage control circuit containing a reverse parallel connection of the thyristor and the diode in each phase of the three-phase AC circuit, the control range of the firing angle $\alpha$ must be 0° to 210° in order to control the output voltage from zero to the full voltage.

Accordingly, the maximum output voltage in the circuit of FIG. 1 cannot be equal to the voltage of the power source as shown in FIG. 2(d).

SUMMARY OF THE INVENTION

It is an object of the present invention to provide firing angle control circuits of the thyristors for controlling the output voltage from zero to the full voltage in a voltage control circuit containing a reverse parallel connection of a thyristor and a diode in each phase of the three-phase AC circuit.

The foregoing and other objects of the present invention have been attained by providing a three-phase AC voltage control circuit containing reverse parallel connections of a thyristor and a diode or reverse parallel connections of thyristors in at least two phases wherein an asymmetrical AC voltage obtained by applying a line voltage of the power source having 30° of phase lead from that of the phase voltage of the power source in the phase containing the thyristor to each polarized delay circuit is used as the power source for a firing angle control circuit of the thyristor in the phase.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings.

DETAILED DESCRIPTION OF THE PREFERRED EMBODIMENTS

Figure 1:
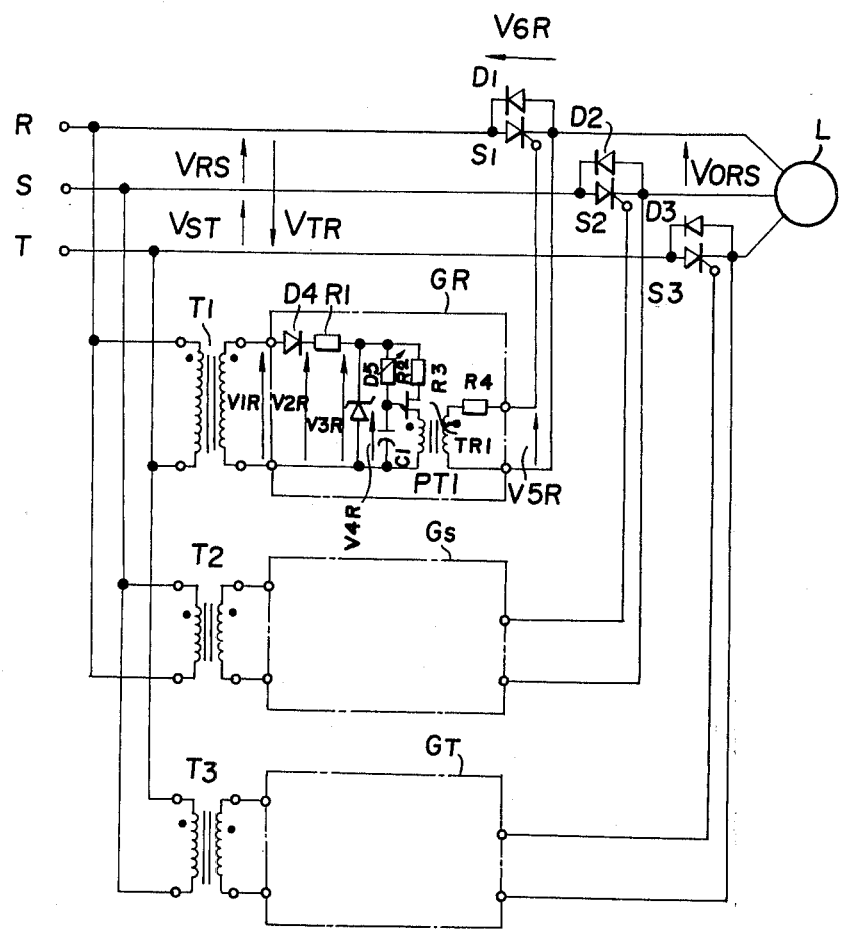
FIG. 1 is a prior art circuit diagram of the three-phase AC voltage control circuit.
Figure 2:
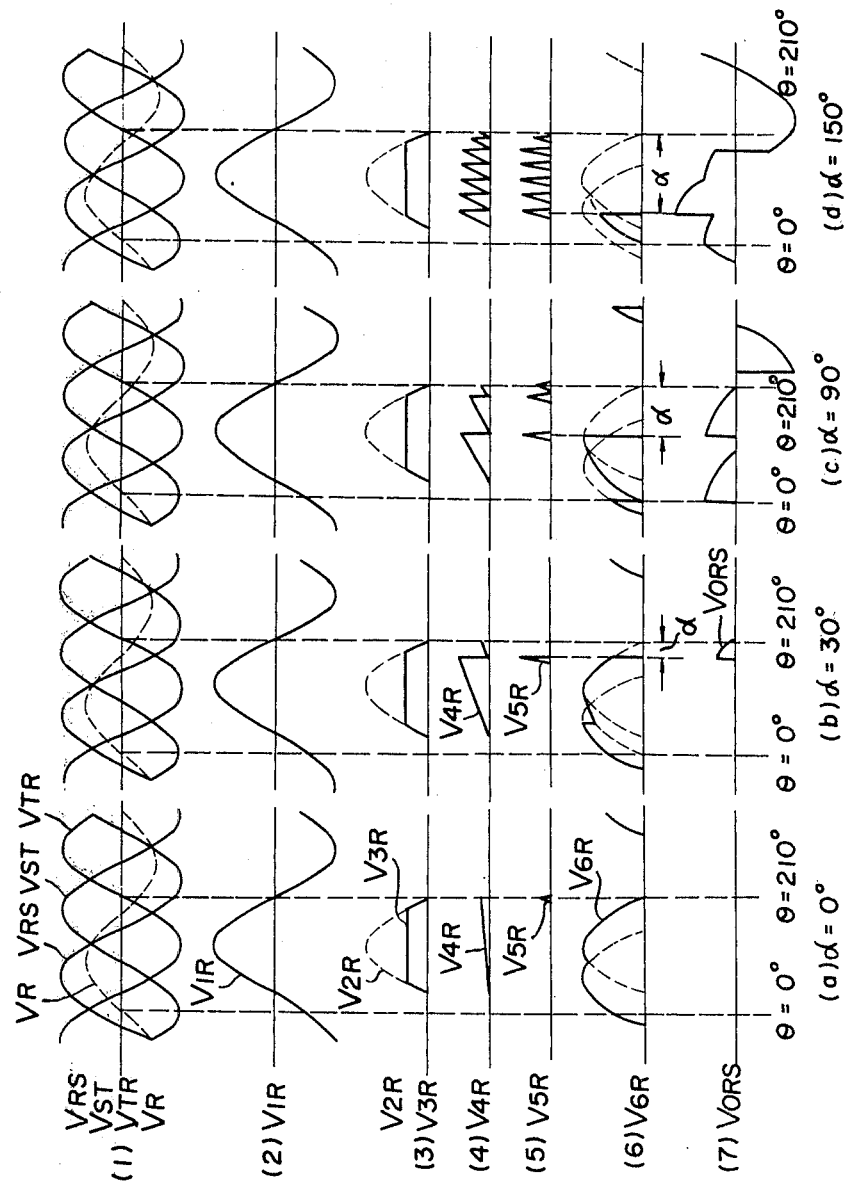
FIG. 2 shows performance characteristic waveforms at various parts in the circuit of FIG. 1.
Figure 3:
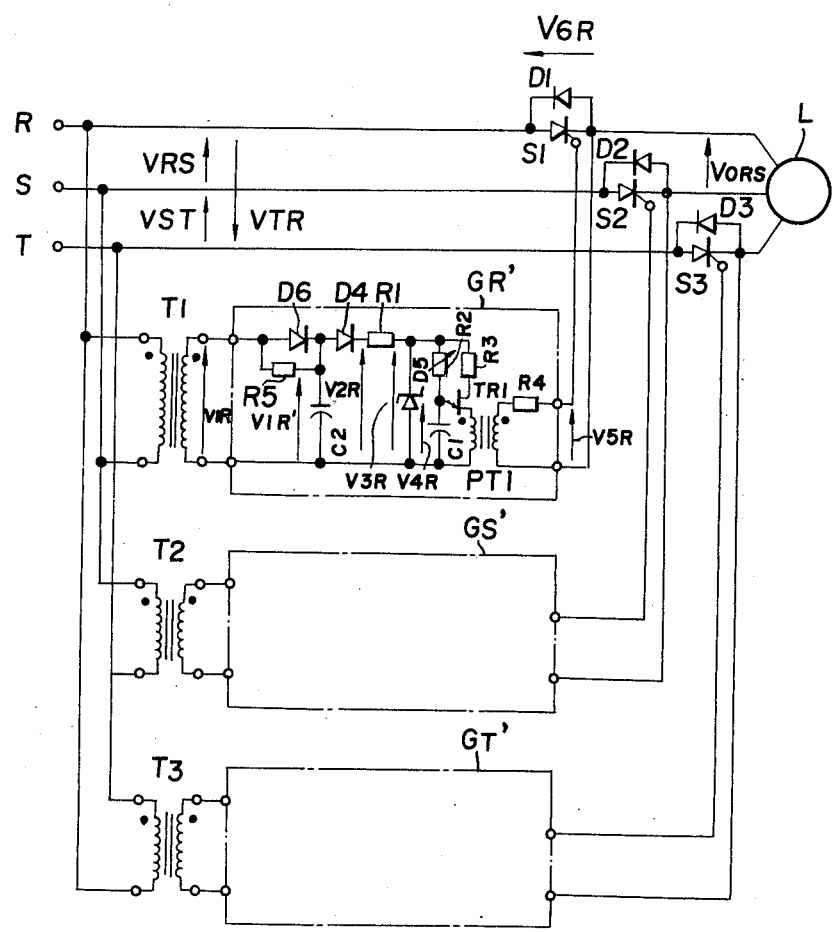
FIG. 3 is a circuit diagram of one embodiment according to the present invention.
Figure 4:
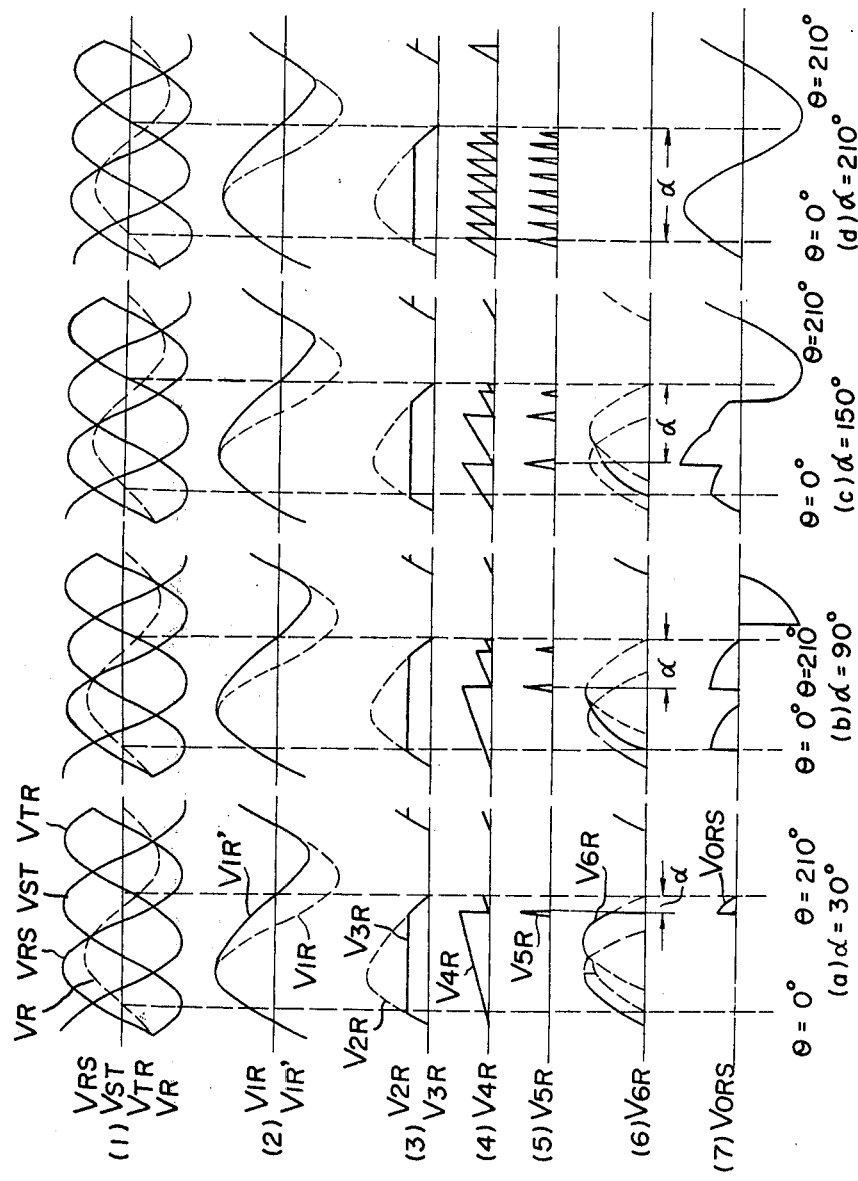
FIG. 4 shows performance characteristic waveforms at various parts in the circuit of FIG. 3.

FIG. 3 is a circuit diagram of one embodiment of the present invention and FIG. 4 shows voltage waveforms at various parts in the circuit of FIG. 3, wherein like reference numerals designate identical or corresponding parts in FIGS. 1 and 2.

A firing angle control circuit $G_{R'}$ in the R phase in FIG. 3 is formed by inserting a polarized delay circuit comprising a diode $D_6$, a resistor $R_5$ and a capacitor $C_2$ in the firing angle control circuit $G_R$ in the R phase of FIG. 1. The internal circuits of the firing angle control circuits $G_S$ and $G_T$ in the S phase and the T phase are the same as the internal circuit of the firing angle control circuit $G'_R$.

In FIG. 3, a voltage having 30° of phase lead from that of the phase voltage of the power source corresponding to the firing angle control circuit is applied through each transformer $T_1$, $T_2$ or $T_3$, to each firing angle control circuit $G'_R$, $G'_S$, or $G'_T$ in the R phase, the S phase or the T phase. That is, a voltage having the same phase as the phase of the voltage between R-S is applied to $G_{R'}$; the voltage having the same phase as the phase of the voltage between S-T is applied to $G_{S'}$ and a voltage having the same phase a the phase of the voltage between T-R is applied to $G_{T'}$.

FIG. 4(1) shows the line voltages $V_{RS}$, $V_{ST}$, $V_{TR}$ and the phase voltage $V_R$ in the R phase of the power source as those of FIG. 2(1).

The AC voltage $V_{1R}$ having 30° of phase lead from the phase voltage $V_R$ applied from the terminals of the secondary winding of the transformer $T_1$ to the firing angle control circuit $G_{R'}$ in the R phase is converted to the asymmetrical AC voltage $V_{1R'}$ as shown in FIG. 4(2) through the polarized delay circuit comprising the diode $D_6$, the resistor $R_5$ and the capacitor $C_2$.

That is, when the AC voltage $V_{1R}$ rises toward positive side, the capacitor $C_2$ is charged through the diode $D_6$ without time lag. On the other hand, when the AC voltage $V_{1R}$ falls toward negative side, the capacitor $C_2$ is discharged with a time lag under the time constant given by the resistor $R_5$ and the capacitor $C_2$.

Accordingly, the voltage waveform between both terminals of the capacitor $C_2$ is delayed only when the voltage $V_{1R}$ falls to form the asymmetrical AC waveform wherein the voltage is reversed from negative to positive at the phase $\theta = -30°$ and from positive to negative at the phase $\theta = 210°$ in FIG. 4.

The asymmetrical AC voltage $V_{1R'}$ is converted to the half-wave rectified wave $V_{2R}$ through the diode $D_4$ as shown in FIG. 4(3) and it is further converted to the trapezoidal wave $V_{3R}$ by the zener diode $D_5$ and it is applied to the timing circuit having the resistor $R_2$ and the capacitor $C_1$ and the unijunction transistor $TR_1$.

The operations of the circuits following to the timing circuit are the same as those of the prior art circuit of FIG. 1 to give the charged voltage $V_{4R}$ of the timing capacitor $C_1$, the pulse output $V_{5R}$, the voltage $V_{6R}$ between A-K of the thyristor $S_1$ and the output voltage $V_{ORS}$ between R-S as shown in FIGS. 4(4) to (7).

As shown in FIG. 4(3), the trapezoidal wave $V_{3R}$ as the power source of the timing circuit and the unijunction transistor in the circuit of FIG. 3 has 240° of the phase width and begins to rise at the point of the phase $\theta = -30°$.

Accordingly, the charging of the timing capacitor $C_1$ is initiated at the point of the phase $\theta = -30°$ as shown in FIG. 4(4), whereby the firing pulse for the thyristor $S_1$ can be generated at the point of $\theta = 0°$ to give 210° of the firing angle $\alpha$ of the thyristor $S_1$ and the full firing of the thyristor $S_1$ can be attained to give an output voltage equal to the voltage of the power source, even though 30° is required for charging the capacitor $C_1$ to the breakover voltage of the transistor $TR_1$, as shown in FIG. 4(d).

Figure 5:
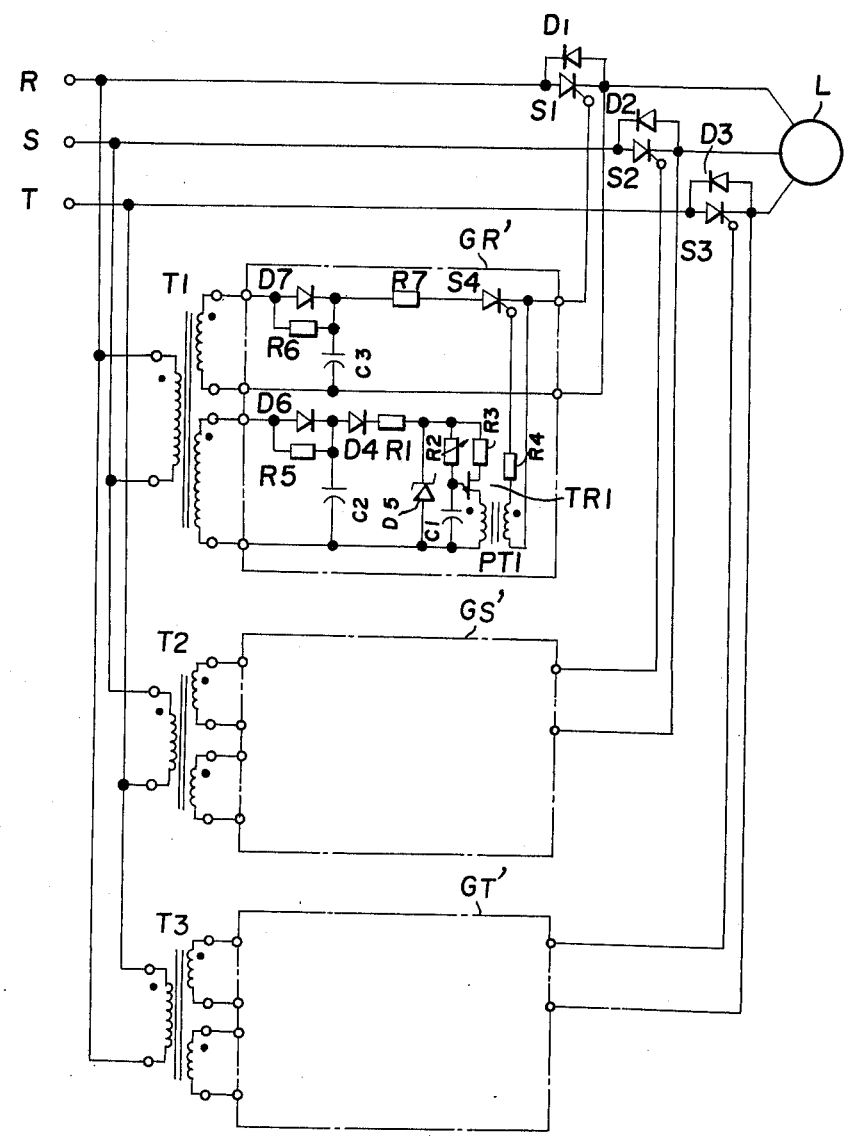
FIG. 5 is a circuit diagram of the other embodiment according to the present invention.

In the above-mentioned description, the thyristors $S_1$ to $S_3$ for output voltage control are directly fired by the outputs of the pulse transformers. Thus, if it is necessary to amplify the firing pulse from the viewpoints of the capacitances of the thyristors $S_1$ to $S_3$, the same function and result as those of the circuit of FIG. 3 can be attained by inserting each polarized delay circuit comprising a diode $D_7$, a resistor $R_6$ and a capacitor $C_3$ in the power source circuit for the thyristor $S_4$ for pulse amplification in each phase as shown in FIG. 5.

In the above-mentioned description, the reverse parallel connection of a thyristor and a diode is connected in each phase of the three-phase AC circuit as the output voltage control circuit. Thus, the same result as that of the circuit of FIG. 3 can be attained by connecting each firing angle control circuit for the thyristor as in FIG. 3 even though each reverse parallel connection of thyristors is connected to each of two phases in the three-phase AC circuit.

As above-mentioned, in accordance with the present invention, the asymmetrical AC voltage having about 240° of phase width of the positive half-wave is given as the power source of the firing angle control circuits of the thyristor by the polarized delay circuits in the voltage control circuit containing a reverse parallel connection of a thyristor and a diode or a reverse parallel connection of thyristors in each phase of the three-phase AC circuit. Accordingly, the control range of the firing angle of the thyristor can be from 0 to more than 210° whereby the output voltage can be controlled from zero to the full voltage.

Obviously, numerous modifications and variations of the present invention are possible in light of the above teachings. It is therefore to be understood that within the scope of the appended claims, the invention may be practiced otherwise than as specifically described herein.

What is claimed is:

1. A three-phase AC voltage control circuit comprising:
   a three-phase AC power source having three line terminals;
   a load;

a plurality of thyristors, each thyristor shunted by an oppositely poled diode and connected between a line terminal and the load;

a plurality of polarized delay circuits, each delay circuit corresponding to a respective thyristor and connected across two line terminals for receiving a voltage having 30° of phase lead from a phase voltage of the power source connected to the corresponding thyristor and for converting the voltage having 30° of phase lead to an asymmetrical AC voltage, each delay circuit having two output terminals;

a plurality of firing angle control circuits, each firing angle control circuit having two input terminals connected respectively to the two output terminals of a corresponding polarized delay circuit and two output terminals connected respectively to the gate and cathode of a corresponding thyristor, each firing angle control circuit including a first diode connected to one of the two input terminals of the firing angle control circuit for converting the asymmetrical AC voltage from the corresponding delay circuit to a half-wave rectified voltage wave;

a zener diode connected between the first diode and the other of the two input terminals of the firing angle control circuit for clipping the half-wave rectified voltage wave to convert the rectified wave to a trapezoidal wave;

a series combination of a timing capacitor and a timing resistor connected across the zener diode, the timing capacitor charging in response to the trapezoidal voltage wave with a speed determined by the timing resistor;

a pulse transformer having a primary winding and a secondary winding, the primary winding of the pulse transformer and a unijunction transistor connected across the zener diode, the unijunction transistor having its emitter connected to the junction of the timing capacitor and the timing resistor, the timing capacitor discharging through the unijunction transistor and the primary winding of the pulse transformer when the charged voltage in the timing capacitor reaches the breakover voltage of the transistor to generate a pulse output, the secondary winding of the pulse transformer connected across the two output terminals of the firing angle control circuit, the transformed pulse output in the secondary winding firing the corresponding thyristor;

whereby the control range of the firing angle of the thyristor is 0° to 210° so that the output voltage to the load can be controlled from zero to the full voltage.

2. The three-phase AC voltage control circuit recited in claim 1 wherein each polarized delay circuit includes:

a second diode connected to one of the two input terminals of the delay circuit;

a delay resistor shunting the second diode; and a delay capacitor connected between the second diode and the other input terminal of the delay circuit, the delay capacitor charging through the second diode without time lag and discharging through the delay resistor with a time lag under a time constant determined by the delay resistor and the delay capacitor.

3. A three-phase AC voltage control circuit comprising:

a three-phase AC power source having three line terminals;

a load;

a plurality of first thyristors, each first thyristor shunted by an oppositely poled second thyristor and connected between a line terminal and the load;

a plurality of polarized delay circuits, each delay circuit corresponding to a respective thyristor and connected across two line terminals for receiving a voltage having 30° of phase lead from a phase voltage of the power source connected to the corresponding thyristor and for converting the voltage having 30° of phase lead to an asymmetrical AC voltage, each delay circuit having two output terminals;

a plurality of firing angle control circuits, each firing angle control circuit having two input terminals connected respectively to the two output terminals of a corresponding polarized delay circuit and two output terminals connected respectively to the gate and cathode of a corresponding thyristor, each firing angle control circuit including:

a first diode connected to one of the two input terminals of the firing angle control circuit for converting the asymmetrical AC voltage from the corresponding delay circuit to a half-wave rectified voltage wave;

a zener diode connected between the first diode and the other of the two input terminals of the firing angle control circuit for clipping the half-wave rectified voltage wave to convert the rectified wave to a trapezoidal wave;

a series combination of a timing capacitor and a timing resistor connected across the zener diode, the timing capacitor charging in response to the trapezoidal voltage wave with a speed determined by the timing resistor;

a pulse transformer having a primary winding and a secondary winding, the primary winding of the pulse transformer and a unijunction transistor connected across the zener diode, the unijunction transistor having its emitter connected to the junction of the timing capacitor and the timing resistor, the timing capacitor discharging through the unijunction transistor and the primary winding of a pulse transformer when the charged voltage in the timing capacitor reaches the breakover voltage of the transistor to generate a pulse output, the secondary winding of the pulse transformer connected across the two output terminals of the firing angle control circuit, the transformed pulse output in the secondary winding firing the corresponding thyristor;

whereby the control range of the firing angle of the thyristor is zero to 210° so that the output voltage to the load can be controlled from zero to the full voltage.

4. The three-phase AC voltage control circuit recited in claim 3 wherein each polarized delay circuit includes:

a second diode connected to one of the two input terminals of the delay circuit;

a delay resistor shunting the second diode; and a delay capacitor connected between the second diode and the other input terminal of the delay circuit; the delay capacitor charging through the second diode without time lag and discharging through the delay resistor with a time lag under a time constant determined by the delay resistor and the delay capacitor.

* * * * *